(12) United States Patent
Daniels

(10) Patent No.: US 8,645,024 B2
(45) Date of Patent: Feb. 4, 2014

(54) MOTORIZED THREE-WHEELED VEHICLE ACTIVE SUSPENSION

(71) Applicant: Sabertooth Motorcycles, LLC, Chestnut Hill, MA (US)

(72) Inventor: Ben Daniels, Chestnut Hill, MA (US)

(*) Notice: Subject to any disclaimer, the term of this patent is extended or adjusted under 35 U.S.C. 154(b) by 0 days.

(21) Appl. No.: 13/657,791

(22) Filed: Oct. 22, 2012

(65) Prior Publication Data
US 2013/0304319 A1 Nov. 14, 2013

Related U.S. Application Data

(60) Provisional application No. 61/549,733, filed on Oct. 20, 2011.

(51) Int. Cl.
*B60G 17/016* (2006.01)

(52) U.S. Cl.
USPC .................. 701/38; 701/41; 701/74; 180/227

(58) Field of Classification Search
USPC ........ 701/38, 41, 45, 70, 74, 79, 81; 180/215, 180/227
See application file for complete search history.

(56) References Cited

U.S. PATENT DOCUMENTS

| 4,325,565 | A | * | 4/1982 | Winchell | 280/282 |
| 4,456,277 | A | * | 6/1984 | Carpenter | 280/282 |
| 4,588,196 | A | * | 5/1986 | Williams, Jr. | 280/835 |
| 4,765,432 | A | * | 8/1988 | Odom | 180/227 |
| 4,877,102 | A | * | 10/1989 | Stewart | 180/217 |
| 5,180,025 | A | * | 1/1993 | Yeh et al. | 180/65.51 |
| 5,433,285 | A | * | 7/1995 | Richards | 180/215 |
| 5,810,383 | A | * | 9/1998 | Anderson | 280/124.116 |

* cited by examiner

*Primary Examiner* — Gertrude Arthur Jeanglaude

(57) ABSTRACT

A system that stiffens the rear suspension of the three-wheeled vehicle in coordination with the operator turning the front wheel to prevent leaning in turns and thus improve handling, performance and safety. The suspension system is controlled by the suspension control computer that receives input from a variety of sensors including a sensor in the steering neck that measures the angular rotation as the handlebars are turned by the operator. Based on these inputs, using proprietary programming, the suspension control computer calculates the timing, degree and appropriate side rear shock absorbing unit to stiffen. Active suspension offers significant advantages over non-active independent rear suspension in that it minimizes adverse handling characteristics caused by suspension leaning in turns while still allowing the comfort and handling of an independent rear suspension, as opposed to a non-independent rear suspension which provides a poor quality ride.

14 Claims, 4 Drawing Sheets

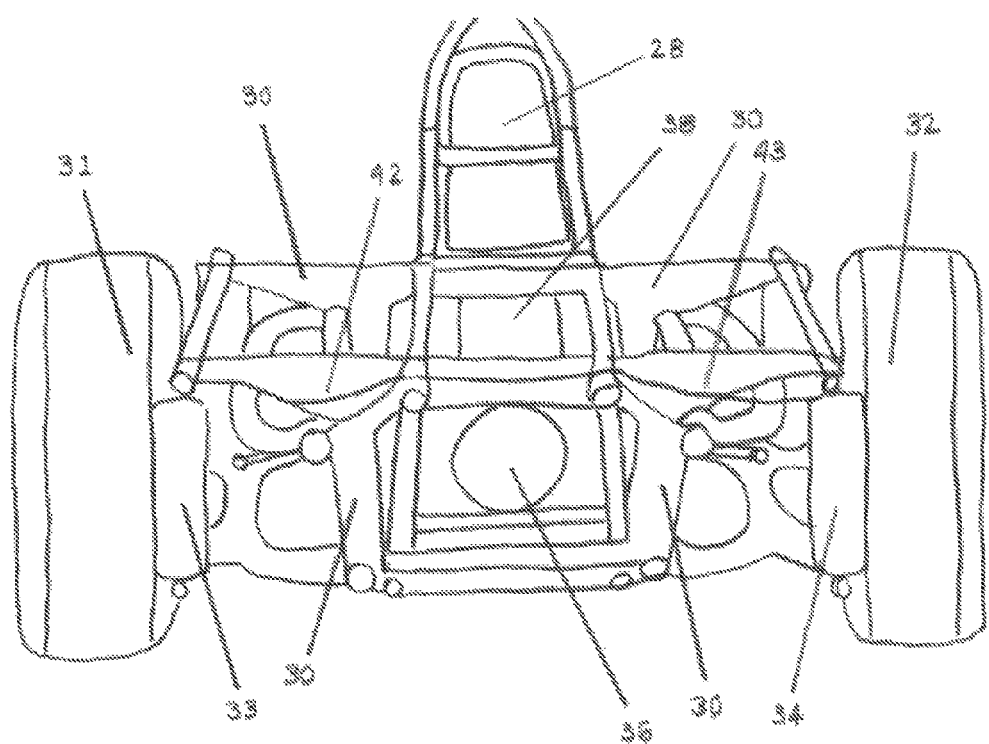

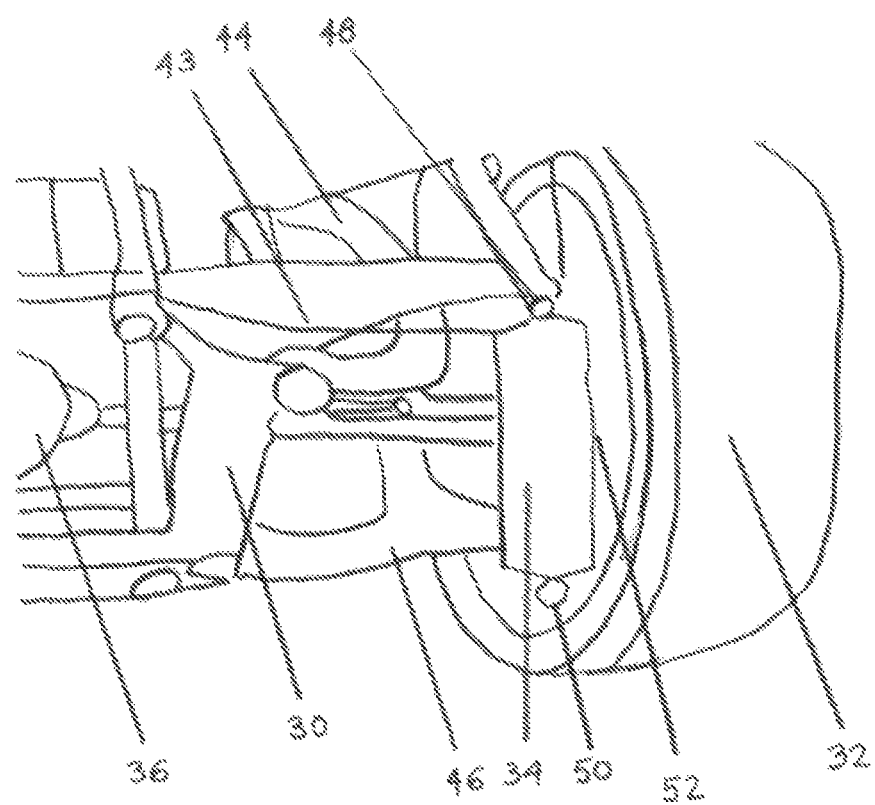

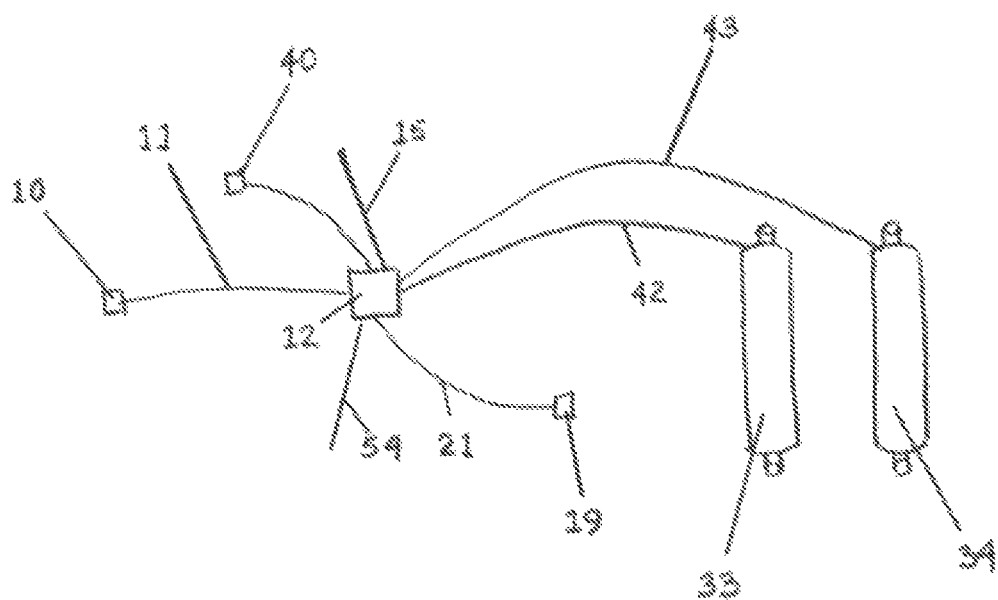

MOTORIZED THREE-WHEELED VEHICLE ACTIVE SUSPENSION

FIELD OF THE INVENTION

The present invention relates to an active independent rear suspension system for a three-wheeled vehicle and, more particularly, to a system that stiffens the shock absorbing unit on the inboard side of a turn in coordination with the operator turning the front wheel, and unstiffening the shock absorber as the wheel is straightened, the degree of stiffening is based on the degree and rate that the front wheel is turned, vehicle speed and steering performance setting selected by the operator.

BACKGROUND OF THE INVENTION

It is well known that two standards of ground vehicles exist. One type is represented by two-wheeled vehicles (example motorcycles) that are turned by the operator first counter-steering, turning the handlebars slightly in the opposite direction of the desired turn, then leaning into the turn and keeping the center of gravity in the plane of the apparent vertical, due to combined gravitational and centrifugal forces. Lean angle is determined by speed and turn radius, i.e. the faster the speed and the tighter the turn radius the more the operator required to lean the motorcycle while turning. This lean also serves to stabilize the motorcycle throughout the turn.

The other type represented by vehicles with stationary stability, such as three-wheeled vehicles (example motorized tricycles) or four-wheeled vehicles (example automobiles). These vehicles steer by turning the front wheel(s) by way of handlebars or a steering wheel. During a turn centrifugal and gravitational forces combine to force the vehicle toward the outside of the turn. If the forces become too great the vehicle can roll over. This is a greater potential problem in a three-wheeled vehicle that has two rear wheels and only one front wheel situated in line with the vehicle's centerline.

An independent rear suspension provides a far better quality and more comfortable ride for the operator and passenger particularly when travelling over a bumpy or uneven road surface, however when turning hard a three-wheeled vehicle can sway or roll to the outside of the turn as the rear suspension components on the inside of the turn are compressed and the suspension components on the outside of the turn are extended. This body roll shifts the center of gravity to the outside wheel in curves and creates a less stable condition. The sharper the turn and the higher the speed the greater the resulting body roll and the less stable the three-wheeled vehicle becomes. To compensate for this condition, the operator must slow down or the three-wheeled vehicle may tip over. A non-independent rear suspension design wherein the left and right rear wheels are linked together and can't move independently reduces this effect, however, this design results in greater unsprung weight. Whereas movement of suspension components, i.e. their ability to track and maintain traction over bumpy or imperfect road surfaces, is inversely proportional to the unsprung weight, non-independent suspension designs will result in a far less comfortable ride for the operator and passenger and can result in the operator and passenger and/or the entire vehicle being bounced around when going over bumps as the bumps are not being absorbed by the vehicle's suspension.

Several designs exist that attempt to improve handling and reduce body roll.

U.S. Pat. Nos. 7,343,997, 7,591,337, 4,064,957, 6,511,078, 6,435,522, 4,487,429, 4,159,128, 6,406,036, 6,328,125, 6,250,649, 6,062,581, 5,169,166, 5,116,069, 5,040,812, 4,974,863, 4,903,857, 4,678,053, 4,660,853, 4,484,648, and 4,088,199 attempt to improve handling, make turning easier and reduce body roll by tilting the three-wheeled vehicle body and/or wheels.

There are several shortcomings of the tilting solution. First, the tilting mechanisms are complicated and have many component parts and are therefore complicated and expensive to manufacture, and can be prone to component failure. Second, any tilting system requires the use of motorcycle tires that necessarily have a rounded profile to enable the motorcycle to lean during turns, however, a consequence of this design is that a motorcycle tire has a much smaller contact patch with the road surface than a comparable width automobile tire that is not designed to lean. Automobile tires perform better in drive systems where the two rear wheels are driven by the vehicle's motor, as is the configuration on virtually all three-wheeled vehicles, because they provide better traction due to their flatter profile and resulting larger contact patch, are more durable and last longer, and are more cost effective.

A design exists that attempts to reduce body roll and improve handling with a rigid non-independent rear suspension design that does not allow the vehicle to lean or squat while turning. This design is intended to minimize flex in the swing-arm and rear-end systems and features a differential rear-end with internal solid axles. The swing-arm is a one piece reinforced design, specially constructed to reduce all torsion effects.

The problem with the non-independent rigid design that while it eliminates leaning in turns, vehicles with this design do not perform well on rough or bumpy roads and provide a poor quality and uncomfortable ride for the operator and passenger for a couple of reasons. First, this design does not allow the rear wheels to move independently of each other making it more difficult for them to follow the contour of the road. Second, the unsprung weight of the suspension components in a suspension system having a solid rear axle is greater than the unsprung weight of the suspension components in an independent suspension system which further limits the ability of the rear wheels to follow bumps in the road and maintain traction as the movement of suspension components is inversely proportional to the unsprung weight.

It would be advantageous to provide a suspension system that provides a comfortable ride for the operator and passenger on a three-wheeled vehicle.

Additionally, it would also be advantageous to provide a suspension system that increases three-wheeled vehicle handling performance in turns.

It would further be advantageous to provide a suspension system that maximizes three-wheeled vehicle stability.

It would further be advantageous to provide a suspension system that improves high speed three-wheeled vehicle handling.

It would further be advantageous to provide a suspension system that minimizes the outward movement of the three-wheeled vehicle's center of gravity during turns.

It would further be advantageous to provide a suspension system that minimizes the likelihood of the three-wheeled vehicle rolling over during turns.

It would further be advantageous to provide a suspension system that keeps all three of the three-wheeled vehicle's wheels firmly planted on the road surface during all riding conditions.

It would further be advantageous to provide a suspension system that enhances the three-wheeled vehicle's rear wheel's ability to maintain traction and follow the road surface when riding over a bumpy or uneven road surface.

It would further be advantageous to provide a suspension system that improves three-wheeled vehicle safety.

SUMMARY OF THE INVENTION

In accordance with the present invention, there is provided a system that stiffens the individual rear shock absorbing units of the active independent rear suspension system of the three-wheeled vehicle in coordination with the operator turning the front wheel for the purpose of preventing leaning or squatting in turns and thus improving vehicle handling, performance and safety. The active independent rear suspension system incorporates pneumatic, hydraulic or electrically reactive rear shock absorbing units that are stiffened pneumatically, hydraulically or an electrically by energizing material that solidifies when voltage is applied. The active independent rear suspension system is controlled by the suspension control computer. The suspension control computer receives input from a variety of sensors including sensors for vehicle speed and a sensor in the steering neck that measures the angular rotation of the front wheel as the handlebars are turned by the operator. The active independent rear suspension system is turned on and off by the operator using a selector switch that also allows the operator to select from a number of preset suspension profiles. Based on all these inputs, using proprietary programming, the suspension control computer calculates the timing, degree and appropriate side rear shock absorbing unit to stiffen. An active independent rear suspension system offers significant advantages over a non-active independent rear suspension system in a three-wheeled vehicle in that it minimizes the adverse handling characteristics caused by the rear suspension leaning or squatting in turns while still allowing the comfort and handling of an independent rear suspension system. An active independent rear suspension system also offers significant advantages over a non-independent rear suspension which also limits leaning or squatting but however provides a poor quality ride and poor performance on bumpy roads.

BRIEF DESCRIPTION OF THE DRAWINGS

A complete understanding of the present invention may be obtained by reference to the accompanying drawings, when considered in conjunction with the subsequent, detailed description, in which:

FIG. 2 is a rear view of a motorized three-wheeled vehicle shown in FIG. 1;

FIG. 3 is a right rear detail view of a motorized three-wheeled vehicle shown in FIG. 1; and FIG. 4 is a detail view of a schematic of the components and connections of the invention.

For purposes of clarity and brevity, like elements and components will bear the same designations and numbering throughout the Figures.

DESCRIPTION OF THE PREFERRED EMBODIMENT

Figure 1:
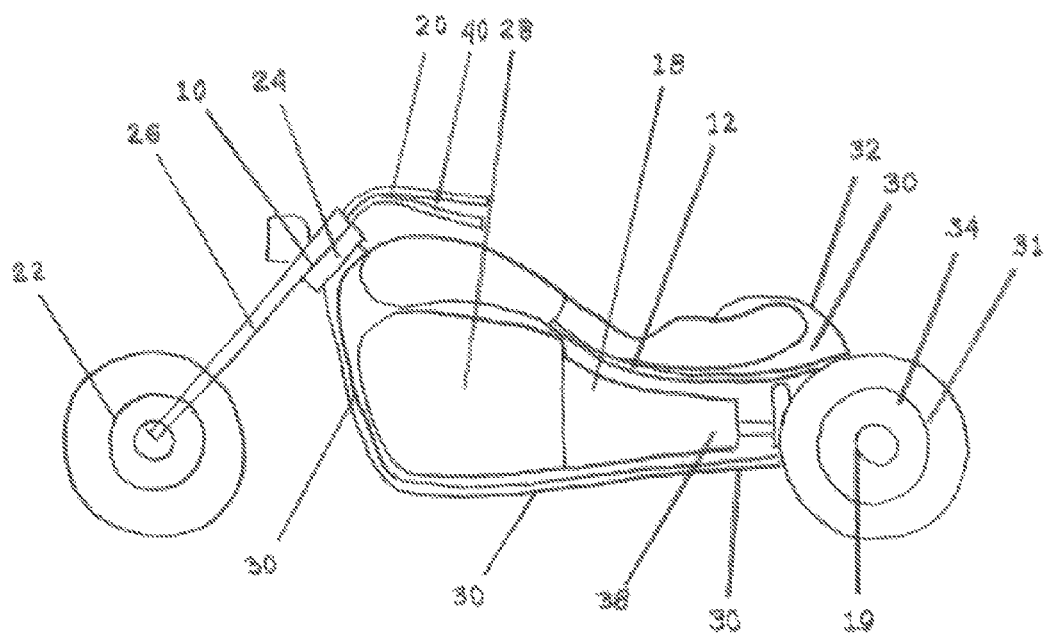
FIG. 1 is a left view of a complete motorized three-wheeled vehicle with the body removed of the invention.

FIG. 1 is a left view of a complete motorized three-wheeled vehicle 18 with the body removed of the invention. The handlebars 20 are used by the operator to turn the front wheel assembly 22 which is connected to the handlebars 20 by the front end assembly 26 which pivots around the steering neck 24. The motor 28 is mounted in the frame 30 and transmits power to the left rear wheel and tire assembly 31 and the right rear wheel and tire assembly 32 through the transmission 38 and rear end 36.

FIG. 2 is a rear view of a motorized three-wheeled vehicle shown in FIG. 1. The upper rear suspension arm 44 and lower rear suspension arm 46 connects the left rear wheel and tire assembly 31 and the right rear wheel and tire assembly 32 to their respective sides of the frame 30 and corresponding wheel hub 52.

FIG. 3 is a right rear detail view of a motorized three-wheeled vehicle shown in FIG. 1. The top of the right rear shock absorbing unit 34 is connected to the upper shock absorbing unit mount 48 and the bottom is attached to the lower shock absorbing unit mount 50.

FIG. 4 is a detail view of a schematic of the components and connections of the invention. The suspension control computer 12 receives input from the front wheel position sensor 10 through the wire to the front wheel position sensor 11 and from the vehicle speed sensor 19 through the wire to vehicle speed sensor 21 and sends an output signal to the left rear shock absorbing unit 33 through the wire to the left rear shock absorbing unit 42 and to the right rear shock absorbing unit 34 through the wire to the right rear shock absorbing unit 43 directing them to stiffen and un-stiffen according to a proprietary algorithm. The suspension control computer 12 is powered by the vehicle's electrical system through the wire to the vehicle electrical system 54 and is controlled by the system control switch 40 through the wire to the system control switch 41.

In summary, the invention functions to stiffen and un-stiffen the individual rear shock absorbing units of the active independent rear suspension in a motorized three-wheeled vehicle where the two rear wheels are driven by the motor, for the purpose of preventing the rear suspension of the vehicle from leaning or squatting while turning. Rear suspension leaning or squatting while turning creates adverse handling characteristics so preventing this will increase performance, handling, ride quality and safety. The suspension control computer controls the stiffness of the right, and left rear shock absorbing units based on factors such as vehicle speed and the degree and rate the operator turns the vehicle's front wheel. While moving straight ahead the suspension functions like a standard independent rear suspension.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A three wheeled vehicle active suspension system for improving steering and handling for a three wheeled vehicle with one front and two rear wheels in turns by stiffening the vehicle's rear suspension component on the inboard side of the turn when the vehicle is turned in coordination with the turning of the front wheel by the vehicle operator, to prevent the three wheeled vehicle from leaning in the turn, which will keep all three of the vehicle's wheels firmly planted on a road and the vehicle's center of gravity over the vehicle's rear end, comprising:

means for sensing angular rotation of any left or right turning movement of the vehicle's front wheel when turned by the vehicle's operator;

means for connecting the vehicle's front wheel position sensor to the vehicle's suspension control computer, electrically connected to said means for sensing angular rotation of any left or right turning movement of the front wheel by the vehicle's operator;

means for measuring the vehicle's road speed;

means for connecting vehicle's speed sensor to suspension control computer, electrically connected to said means for measuring the vehicle's road speed;

means for controlling of rear suspension which determines the stiffness, rate and other properties of the vehicle's rear shock absorbers, electrically connected to said means for connecting vehicle's speed sensor to vehicle's suspension control computer, and electrically connected to said means for connecting the front wheel position sensor to the suspension control computer;

means for providing shock absorbing to left rear end of three wheeled vehicle;

means for connecting the vehicle's suspension control computer to the vehicle's left rear shock absorbing unit, electrically connected to said means for providing shock absorbing to left rear end of three wheeled vehicle, and electrically connected to said means for controlling of left rear suspension which determines the stiffness, rate and other properties of the rear shock absorbers;

means for providing shock absorbing for the right rear end of three wheeled vehicle;

means for connecting the vehicle's suspension computer to the vehicle's right rear shock absorbing unit, electrically connected to said means for providing shock absorbing for the right rear end of three wheeled vehicle, and electrically connected to said means for controlling of right rear suspension which determines the stiffness, rate and other properties of the rear shock absorbers;

means for allowing the vehicle's operator to turn the vehicle's active suspension system on and off and/or control one or more functions of the vehicle's active suspension system including rate, responsiveness, stiffness, ride height, ride quality and other functions; and means for connecting the vehicle's active suspension system control switch to the vehicle's suspension control computer, electrically connected to said means for allowing the vehicle's operator to turn the active suspension system on and off and/or control one or more functions of the system including rate, responsiveness, stiffness, ride height, ride quality and other functions, and electrically connected to said means for controlling of rear suspension which determines the stiffness, rate and other properties of rear shock absorbers.

2. The three wheeled vehicle active suspension system in accordance with claim 1, wherein said means for sensing angular rotation of any left or right turning movement of the front wheel by the operator comprises a front wheel position sensor.

3. The three wheeled vehicle active suspension system in accordance with claim 1, wherein said means for connecting the front wheel position sensor to the suspension control computer comprises a front wheel position sensor connector.

4. The three wheeled vehicle active suspension system in accordance with claim 1, wherein said means for measuring the vehicle's road speed comprises a vehicle speed sensor.

5. The three wheeled vehicle active suspension system in accordance with claim 1, wherein said means for connecting vehicle speed sensor to suspension control computer comprises a vehicle speed sensor connector.

6. The three wheeled vehicle active suspension system in accordance with claim 1, wherein said means for controlling of rear suspension which determines the stiffness, rate and other properties of the rear shock absorbers comprises a suspension control computer.

7. The three wheeled vehicle active suspension system in accordance with claim 1, wherein said means for providing shock absorbing to left rear end of three wheeled vehicle comprises a left rear shock absorbing unit actuated by air, hydraulic, electric or other mechanism.

8. The three wheeled vehicle active suspension system in accordance with claim 1, wherein said means for connecting the suspension control computer to left rear shock absorbing unit comprises a wire to left rear shock absorbing unit.

9. The three wheeled vehicle active suspension system in accordance with claim 1, wherein said means for providing shock absorbing to right rear end of three wheeled vehicle comprises a right rear shock absorbing unit actuated by air, hydraulic, electric or other mechanism.

10. The three wheeled vehicle active suspension system in accordance with claim 1, wherein said means for connecting the suspension computer to the right rear shock absorbing unit comprises a wire to right rear shock absorbing unit.

11. The three wheeled vehicle active suspension system in accordance with claim 1, wherein said means for allowing the operator to turn the active suspension system on and off and control the function of the system comprises a switch having an on position, off position, and one or more preset system positions.

12. The three wheeled vehicle active suspension system in accordance with claim 1, wherein said means for connecting the system control switch to the suspension control computer comprises a wire to system control switch.

13. A three wheeled vehicle active suspension system for improving steering and handling for a three wheeled vehicle with one front and two rear wheels in turns by stiffening the vehicle's rear suspension component on the inboard side of the turn when the vehicle is turned in coordination with the turning of the front wheel by the vehicle operator, to prevent the three wheeled vehicle from leaning in the turn, which will keep all three of the vehicle's wheels firmly planted on a road and the vehicle's center of gravity over the vehicle's rear end, comprising:

a front wheel position sensor, for sensing angular rotation of any left or right turning movement of the vehicle's front wheel when turned by the vehicle's operator;

a front wheel position sensor connector, for connecting the front wheel position sensor to the vehicle's suspension control computer, electrically connected to said front wheel position sensor;

a vehicle speed sensor, for measuring the vehicle's road speed;

a vehicle speed sensor connector, for connecting vehicle speed sensor to suspension control computer, electrically connected to said vehicle speed sensor;

a suspension control computer, for controlling of rear suspension which determines the stiffness, rate and other properties of the vehicle's rear shock absorbers, electrically connected to said vehicle speed sensor connector, and electrically connected to said front wheel position sensor connector;

a left rear shock absorbing unit actuated by air, hydraulic, electric or other mechanism, for providing shock absorbing to left rear end of three wheeled vehicle;

a wire to left rear shock absorbing unit, for connecting the vehicle's suspension control computer to left rear shock absorbing unit, electrically connected to said left rear shock absorbing unit, and electrically connected to said suspension control computer;

a right rear shock absorbing unit actuated by air, hydraulic, electric or other mechanism, for providing shock absorbing to right rear end of three wheeled vehicle;

a wire to right rear shock absorbing unit, for connecting the vehicle's suspension control computer to right rear shock absorbing unit, electrically connected to said right rear shock absorbing unit, and electrically connected to said suspension control computer;

a system control switch having an on position, off position, and one or more preset system positions, for allowing the operator to turn the active suspension system on and off and/or control one or more functions of the system including rate, responsiveness, stiffness, ride height, ride quality and other functions; and a wire to system control switch, for connecting the system control switch to the suspension control computer, electrically connected to said system control switch, and electrically connected to said suspension control computer.

14. A three wheeled vehicle active suspension system for improving steering and handling for a three wheeled vehicle with one front and two rear wheels in turns by stiffening the vehicle's rear suspension component on the inboard side of the turn when the vehicle is turned in coordination with the turning of the front wheel by the vehicle operator, to prevent the three wheeled vehicle from leaning in the turn, which will keep all three of the vehicle's wheels firmly planted on a road and the vehicle's center of gravity over the vehicle's rear end, comprising:

a front wheel position sensor, for sensing angular rotation of any left or right turning movement of the vehicle's front wheel when turned by the vehicle's operator;

a front wheel position sensor connector, for connecting the front wheel position sensor to the vehicle's suspension control computer, electrically connected to said front wheel position sensor;

a vehicle speed sensor, for measuring the vehicle's road speed;

a vehicle speed sensor connector, for connecting vehicle speed sensor to suspension control computer, electrically connected to said vehicle speed sensor;

a suspension control computer, for controlling of rear suspension which determines the stiffness, rate and other properties of the vehicle's rear shock absorbers, electrically connected to said vehicle speed sensor connector, and electrically connected to said front wheel position sensor connector;

a left rear shock absorbing unit actuated by air, hydraulic, electric or other mechanism, for providing shock absorbing to left rear end of three wheeled vehicle;

a wire to left rear shock absorbing unit, for connecting the vehicle's suspension control computer to left rear shock absorbing unit, electrically connected to said left rear shock absorbing unit, and electrically connected to said suspension control computer;

a right rear shock absorbing unit actuated by air, hydraulic, electric or other mechanism, for providing shock absorbing to right rear end of three wheeled vehicle;

a wire to right rear shock absorbing unit, for connecting the vehicle's suspension control computer to right rear shock absorbing unit, electrically connected to said right rear shock absorbing unit, and electrically connected to said suspension control computer;

a system control switch having an on position, off position, and one or more preset system positions, for allowing the operator to turn the active suspension system on and off and/or control one or more functions of the system including rate, responsiveness, stiffness, ride height, ride quality and other functions; and a wire to system control switch, for connecting the system control switch to the suspension control computer, electrically connected to said system control switch, and electrically connected to said suspension control computer.

* * * * *